(12) United States Patent
Feeser (10) Patent No.: US 10,365,991 B1
(45) Date of Patent: Jul. 30, 2019

(54) SYSTEM AND METHOD FOR PRINTER DRIVER MANAGEMENT IN AN ENTERPRISE NETWORK

(71) Applicant: OPEN INVENTION NETWORK LLC, Durham, NC (US)

(72) Inventor: Colin Lee Feeser, Atlanta, GA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 231 days.

(21) Appl. No.: 15/366,463

(22) Filed: Dec. 1, 2016

Related U.S. Application Data (63) Continuation of application No. 13/759,418, filed on Feb. 5, 2013, now Pat. No. 9,519,450, which is a continuation of application No. 11/426,160, filed on Jun. 23, 2006, now Pat. No. 8,368,915.

(51) Int. Cl.
| | |
|---|---|
| H04N 1/00 | (2006.01) |
| G06F 8/65 | (2018.01) |
| G06F 11/36 | (2006.01) |
| G06F 3/12 | (2006.01) |

(52) U.S. Cl.
CPC ........ *G06F 11/3668* (2013.01); *G06F 3/1225* (2013.01); *G06F 3/1256* (2013.01); *G06F 3/1296* (2013.01); *G06F 8/65* (2013.01); *H04N 1/00344* (2013.01)

(58) Field of Classification Search
CPC ........ G01M 19/00; G06F 11/00; G06F 15/16; G06F 3/00; G06F 9/4411

USPC .......... 358/1.15, 1.18; 714/25, 35, 38; 382/232; 705/261
See application file for complete search history.

(56) References Cited

U.S. PATENT DOCUMENTS

| | | | | |
|---|---|---|---|---|
| 4,706,561 | A * | 11/1987 | Greer .................... | 101/93.01 |
| 4,843,385 | A * | 6/1989 | Borras .................... | 340/5.33 |
| 5,421,004 | A * | 5/1995 | Carpenter et al. ...... | 714/25 |
| 6,527,359 | B1 * | 3/2003 | Otsuki .................... | 347/19 |
| 6,609,216 | B1 * | 8/2003 | Almy et al. ............. | 714/25 |
| 6,655,779 | B2 * | 12/2003 | Usui et al. .............. | 347/19 |
| 7,078,924 | B2 * | 7/2006 | Grimes et al. .......... | 324/750.3 |
| 7,102,765 | B1 * | 9/2006 | Abi-Saleh et al. ..... | 358/1.13 |
| 7,106,843 | B1 * | 9/2006 | Gainsboro et al. ..... | 379/191 |
| 7,133,141 | B1 * | 11/2006 | Abi-Saleh ............... | 358/1.13 |
| 7,142,846 | B1 * | 11/2006 | Henderson .............. | 455/417 |
| 7,168,003 | B2 * | 1/2007 | Lozano et al. .......... | 714/25 |
| 2003/0055919 | A1 * | 3/2003 | Fong et al. ............. | 709/220 |
| 2003/0206228 | A1 * | 11/2003 | Trevers et al. .......... | 348/14.01 |

(Continued)

*Primary Examiner* — Akwasi M Sarpong (57) ABSTRACT

A method, system and program product for printer driver management in an enterprise network. Each requested printer driver is tested in a controlled environment to determine if the driver is compatible with at least one other driver in a set of drivers. The tested printer driver is conditioned for inclusion in a central repository that stores a plurality of sets of versioned drivers, if the printer driver is determined to be compatible. The tested driver and at least one associated file are packaged and stored in the central repository. The tested driver and associated file are deployed to at least one server hosting a distributed file share. The tested driver and associated file are downloaded to at least one print server. Driver files are touched with a date and time stamp so that workstations will automatically download updated printer drivers from the print server.

31 Claims, 6 Drawing Sheets

(56) References Cited

U.S. PATENT DOCUMENTS

2004/0215754 A1* 10/2004 Orleth et al. ................. 709/223
2008/0077973 A1*  3/2008 Zimmer et al.

* cited by examiner

SYSTEM AND METHOD FOR PRINTER DRIVER MANAGEMENT IN AN ENTERPRISE NETWORK

CROSS-REFERENCE TO RELATED APPLICATIONS

This application is a continuation of and claims priority from U.S. patent application Ser. No. 13/759,418, filed on Feb. 5, 2013 entitled SYSTEM AND METHOD FOR PRINTER DRIVER MANAGEMENT IN AN ENTERPRISE NETWORK, now issued U.S. Pat. No. 9,519,450, issued on Dec. 13, 2016, which is a continuation of U.S. patent application Ser. No. 11/426,160, filed on Jun. 23, 2006 entitled SYSTEM AND METHOD FOR PRINTER DRIVER MANAGEMENT IN AN ENTERPRISE NETWORK, now issued U.S. Pat. No. 8,368,915, issued on Feb. 5, 2013, which are incorporated by reference herein in their entirety.

BACKGROUND OF THE INVENTION

The present invention relates generally to computer printers and, more particularly, to management of printer drivers in a large enterprise computer network.

Large business enterprises have struggled for years on managing a proliferation of computer printers from various vendors, versioned printer drivers and print servers. For more than a decade, the assignee of the present invention has struggled to manage its more than 5,000 network printers using approximately 350 drivers on 150 print servers. It is important for businesses with large computer networks to have an organized approach to printer driver management in order to avoid infrastructure problems caused by problematic drivers.

Thus, there is a need for software tools to provide centralized support and management of print servers and print drivers. To meet this need, the software tools must have the capability to condition print servers and to deploy printer drivers or replicate print servers.

SUMMARY OF THE INVENTION

The present invention is directed to a method for managing and maintaining printers, print servers, and print drivers on a large wide area network based upon a strict concept of centralized support and driver management. The invention includes several utility tools for performing tasks related to managing network printers, for testing and conditioning printer drivers, and for touching the date and time stamp on driver files, so that workstations will automatically download updated drivers from the print servers. Since a single print driver could have potential impact on the productivity of a server offering print services, the invention includes a print driver deployment process in which the print drivers are tested in a controlled environment prior to being installed on a production server.

The drivers are tested and deployed to a single server used primarily for the storage and maintenance of versioned sets of print drivers. This server is referred to herein as the Print Driver Update (PDU) server. On the PDU server, key folder share names are kept constant, allowing for the continual update, versioning, and access of the centralized driver set.

The final versioned set of drivers is then made available to a large number of servers across a very large wide area network by pushing them out to Distributed File System (DFS) shares strategically placed around the network. Whenever a driver is needed by an individual server, it can access it from the closest server hosting the DFS share containing the latest driver set.

The PDU server has a folder assigned specifically to the maintenance of driver files and information files (.inf files). Information files provide installation instructions for installing and registering software components downloaded from the Internet. Information files provide the ability to create custom software installation instructions including registration entries and destination directories. Under the PDU folder is another folder that holds all of the driver files excluding the corresponding .inf file. Another folder under the PDU folder holds all the versioned .inf files. Under each of these folder structures is a version number folder that holds the different iterations of driver versions for the driver files and the .inf files.

The printer tools utility of the invention manages the maintenance of share names and deployment of drivers from the PDU server to the DFS shares. The printer tools executable (PrinterTools.exe) is designed to be flexible and easy to use from the command line, but is also designed to be launched from other graphical user interface (GUI) tools such as a server customizer tool, as described in co-pending, commonly assigned patent application entitled "System and Method for Server Customization," application Ser. No. 11/407,659, filed on Apr. 20, 2006. The disclosure of this patent application is incorporated by reference in its entirety herein. The printer tools utility's argument driven nature gives it the ability to perform a large variety of tasks related to managing network printers. In the prior art, there have been many different tools, both GUI and command-line, which were developed for the purpose of managing network printers. The printer tools utility is designed to replace other tools with at least the same functionality and can be launched from either the command-line or from GUI launching tools.

Other tools are included in the printer tools set including a printer driver test utility (PDTest) and a print driver "touch" utility (PDTouch). The printer driver test utility executable (PDTest.exe) is a GUI utility designed for the purpose of testing print drivers and conditioning them for inclusion in a larger set of centrally managed printer drivers allowed to be installed on a companies print servers. The printer driver touch utility (PDTouch) is a small touch utility specifically designed for touching the date and time stamp on driver files so that workstations will automatically download updated drivers from the servers.

In one aspect of the invention, a method is provided for printer driver management in an enterprise network. Each requested printer driver is tested in a controlled environment to determine if the driver is compatible with at least one other driver in a set of drivers. The tested printer driver is conditioned for inclusion in a central repository that stores a plurality of sets of versioned drivers, if the printer driver is determined to be compatible. The tested driver and at least one associated file are packaged and stored in the central repository. The tested driver and associated file are deployed to at least one server hosting a distributed file share. The tested driver and associated file are automatically downloaded to at least one print server.

In another aspect of the invention, a computer program product is provided for printer driver management in an enterprise network. The computer program product includes a computer readable medium having computer readable code embedded therein. The computer readable medium includes program instructions that test each requested printer driver in a controlled environment to determine if the driver is compatible with at least one other driver in a set of drivers; program instructions that condition the tested printer driver for inclusion in a central repository that stores a plurality of sets of versioned drivers, if determined to be compatible; program instructions that store the tested driver and at least one associated file in the central repository; program instructions that deploy the tested driver and associated file to at least one server hosting a distributed file share; and program instructions that automatically download the tested driver and associated file to at least one print server.

In another aspect of the invention, a system is provided for printer driver management in an enterprise computer network. The system includes a test server for testing each requested printer driver in a controlled environment. The system also includes a central server and data repository for storing a plurality of sets of versioned printer drivers and a plurality of print servers. A printer driver test component tests the requested printer driver on the test server and conditions the printer driver for inclusion in the central data repository. A printer tools component manages a deployment of the requested printer driver and an associated file to the plurality of print servers. The system can also include a plurality of servers hosting distributed file shares for storing the printer drivers and associated files for automatic distribution to the print servers.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

The functionality of the present invention is built around a centralized support model of testing and maintaining a centralized set of print drivers that is strictly enforced for exclusive use on the print servers. The invention also provides tools for printer support including a driver test utility for testing the viability of a print driver working compatibly with many other drivers on a network print server.

Figure 1:
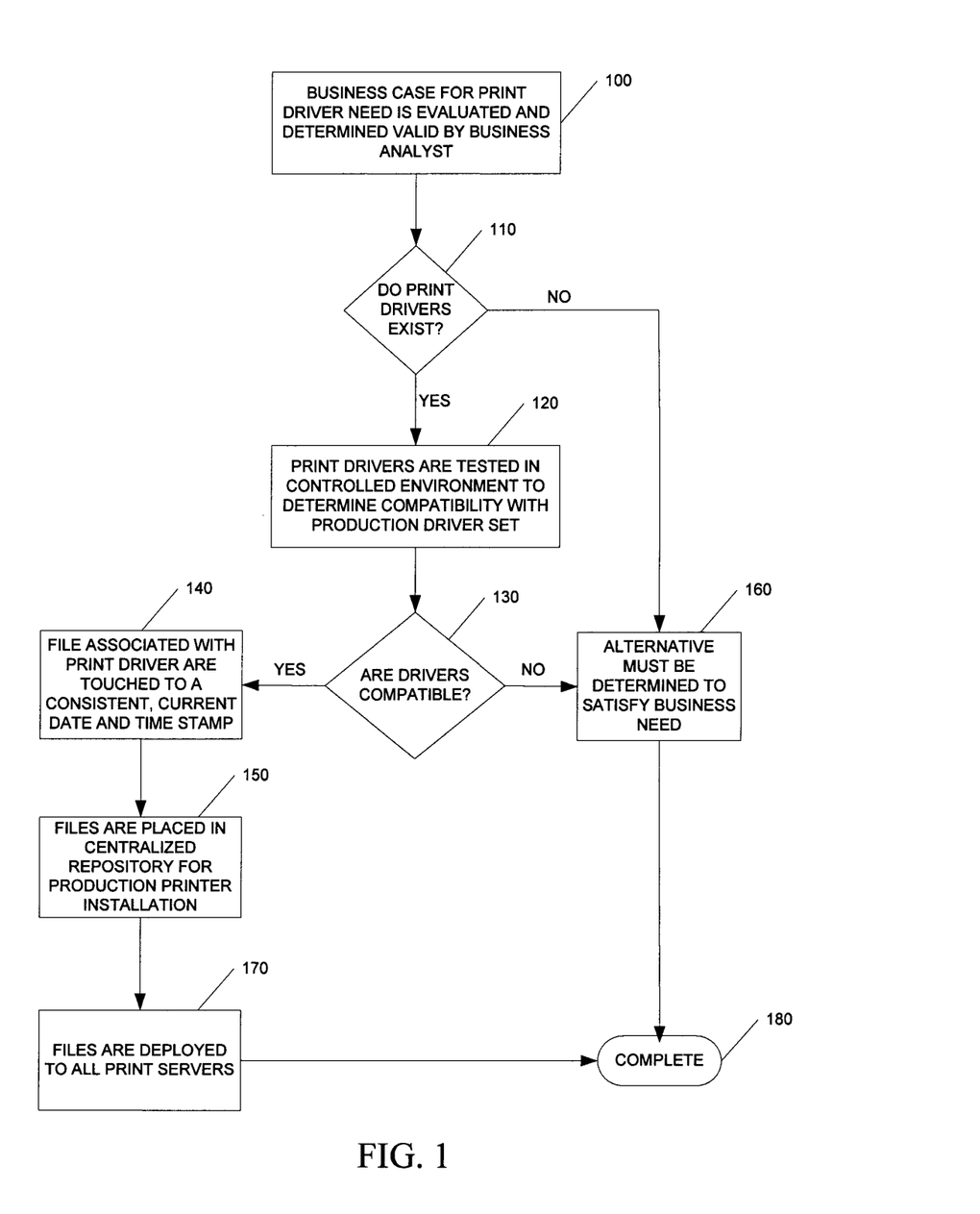
FIG. 1 illustrates the print driver deployment process of the invention.

Because of the potential impact that a single print driver could have on the productivity of a server offering print services, it is of paramount importance to manage and test the print drivers before they are installed on a production server. As illustrated in FIG. 1, the method for printer driver management determines the need (step 100), location, test (step 120) and deployment (step 150) of each print driver used on a server to a centralized set of drivers. This process reduces the support costs and productivity loss associated with discovering problems caused by an errant print driver.

The prior art print driver deployment process began with an exhaustive testing procedure utilizing a full lab environment and a very technically-oriented person carefully stepping through each phase of driver installation and usage, monitoring every detail and then passing or failing the driver. The print driver test utility of the present invention can do most of the testing and monitoring, passing and failing of a driver, allowing a moderately technical person to manage the driver testing process (step 120). The print driver test utility cuts down on the costs of the lab environment, requiring the use of a single testing server.

Once the drivers are tested, they are deployed to a single server (step 150) used primarily for the storage and management of versioned sets of print drivers. This entire process is termed the print driver update process or PDU. The print driver update server is referred to herein as the PDU server. Giving this server a Domain Name Service (DNS) canonical name (CNAME) of "PDU" provides the ability for utilities to access the central location of the drivers regardless of server swap outs, moves or other changes. On the PDU server are key folder share names, which also are maintained constant, allowing for the continual update, versioning and access of the centralized driver set.

The final step of the method is to make the final versioned set of drivers easily available to a large number of servers across a very large wide area network by pushing them out to DFS shares strategically placed around the network (step 170). Thus, whenever a driver is needed by an individual print server, the print server can access the driver from the closest server hosting the DFS share containing the latest driver set.

Figure 2:
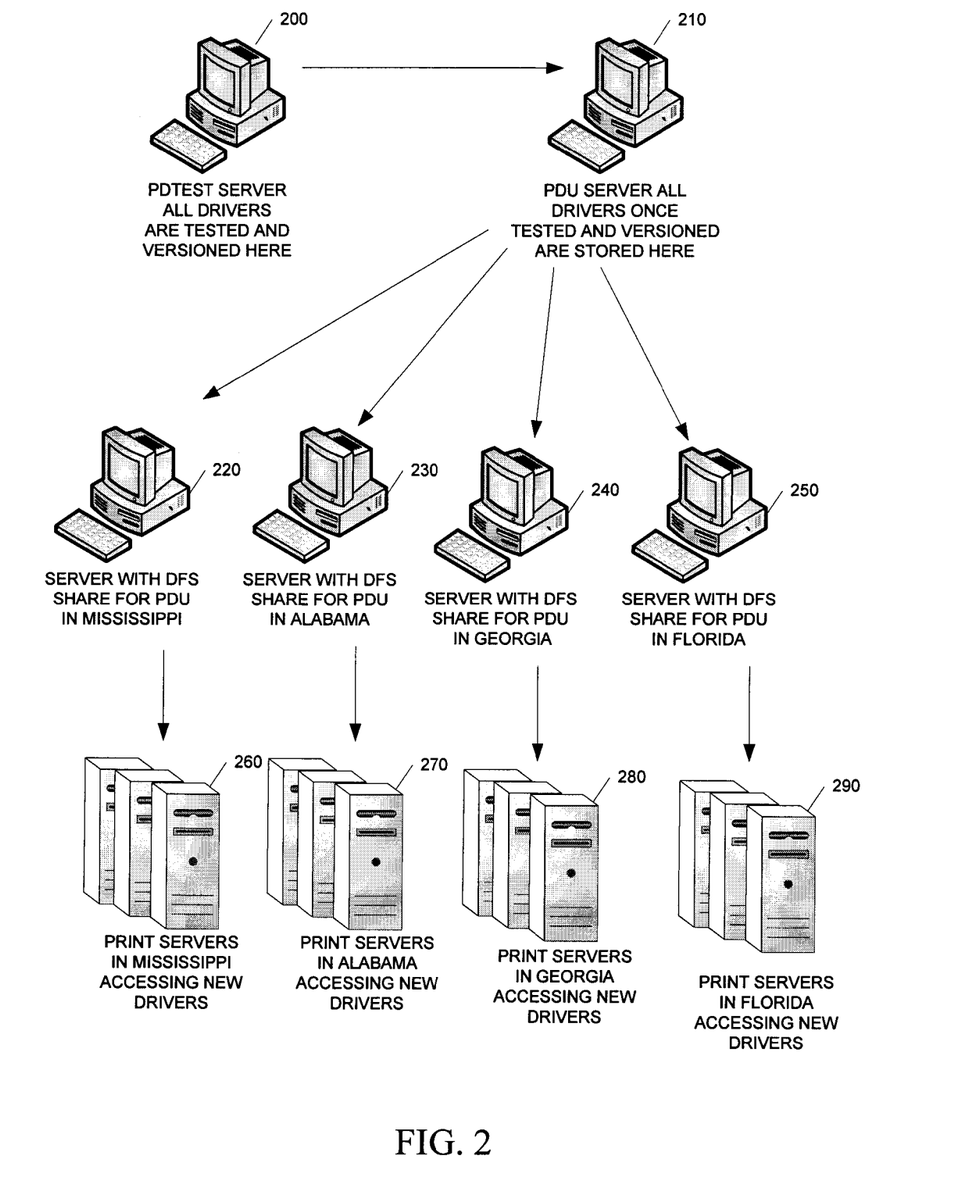
FIG. 2 illustrates a centralized scheme of driver deployment in a large computer network located in a plurality of geographical regions.
Figure 3:
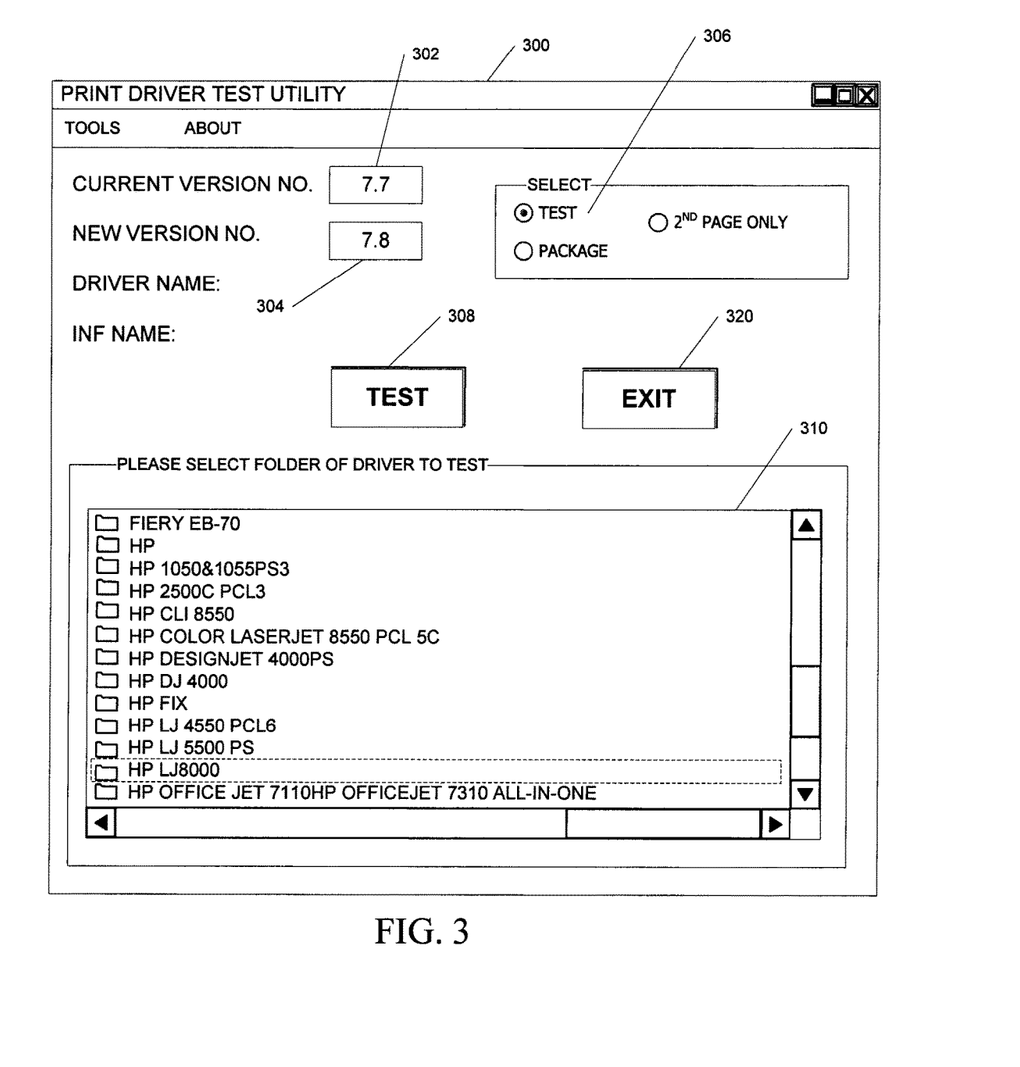
FIG. 3-6 illustrates exemplary user interfaces for the print driver test utility of the present invention.

FIG. 2 illustrates a centralized scheme of driver deployment in a large computer network located in a plurality of geographical regions. All print drivers are tested and versioned on a print driver test server 200. After each driver is tested and versioned, it is stored on a centralized print driver update (PDU) server 210. The print drivers are deployed to a plurality of servers 220, 230, 240, 250 for a particular region, each server having a DFS share. The updated printer drivers are automatically downloaded to print servers 260, 270, 280, 290 from the geographically nearest server with DFS share.

The steps of the driver deployment process are important for the user to gain an understanding of how the functionality of the printer tools utility is configured. It is also important to understand the structure of shares on the PDU server and in DFS. The PDU server has a folder assigned specifically to the maintenance of driver files and information (.inf) files. The top-level name of the structure is arbitrary, but is referred to herein as the PDU folder. Under the PDU folder is a folder that holds all of the driver files excluding the corresponding .inf file. With the transition of drivers from Windows NT to Windows 2000 to Windows XP/2003, this folder is referred to herein as XPDrivers. Also under the PDU folder is a folder named "Inf." The Inf folder holds all of the versioned .inf files. Under each of these folder structures is a version number folder that holds the different iterations of driver versions for the driver files and the .inf files. The current version folder has a corresponding share name of pdu_xp$ and pdu_inf$. This share name will change from folder to folder as the versions change making it easy for the tools to always have access to the latest tested drivers.

Printer Tools Utility

The printer tools utility executable helps to manage the maintenance of share names and the deployment of drivers from the PDU server to the DFS shares. When the printer tools utility executable (PrinterTools.exe) starts to install a print driver on a print server, it looks to pull the print driver from two DFS structures named \\domain_name\dfsroot\pdu\pdu_xp and \\domain_name\dfsroot\pdu\pdu_inf, respectively. These DFS share structures are easily setup on a Microsoft Windows computer network. Each DFS share structure holds corresponding files, i.e., the pdu_xp share holds the driver files and the pdu_inf share holds driver .inf files. Table 1 below lists the printer driver tools utility functions and corresponding executable arguments

TABLE 1

| | |
|---|---|
| Install Print Driver | -ipd \\server drivername |
| Delete Print Driver | -dpd \\server drivername |
| Enumerate Print Drivers | -epd \\server |
| Install Printer Port(LPT) | -ipplp \\server portname queue bytecnt(true\|false) |
| Install Printer Port(RAW) | -ippraw \\server portname |
| Install Printer Port(LOCAL) | -ipplocal \\server portname |
| Delete Printer Port | -dpp \\server portname |
| Enumerate Printer Ports | -dpp \\server |
| Install Printer | -ipr \\server printername portname drivername |
| Delete Printer | -dpr \\server printername |
| Enumerate Printers | -epr \\server |
| Remove All Printers, Ports & Drivers | -zap! \\server [force] |
| Backup Printers | -backup \\server |
| Restore Printers | -restore \\SrcServer \\TgtServer |
| Ping Device | ping devicename |
| Restart Print Spooler | -restart \\server |
| Stop Print Spooler | -stop \\server |
| Start Print Spooler | -start \\server |
| Create PDEnum.ini from PDU.ini | pdu2pdenum |
| Changes the network shares named pdu_xp$ and pdu_inf$ to new PDU version number. Prompts for PDU version number. Also, a call is made to PDTouch (if it is located in the same folder). This will touch all files in the pdu_xp$ and pdu_inf$ folders. | SetPDUShares |

A description of the functions listed in Table 1 is provided in the following paragraphs. Technical terms used in the following paragraphs have their usual and customary meaning unless otherwise defined herein. Specifically, a printer is a software interface between an operating system and a print device. A print device is the hardware that physically produces the printed documents. A printer port is a software interface through which print jobs are directed to either a local print device or a network-connected print device. A print server is a computer that serves as host for printers associated with print devices. A printer driver is software specific to each print device that translates printing commands into printer language for each print device. Examples of printer languages are PCL5 and PostScript. A print job is the actual document to be printed along with the print processing command. A print spooler is a process that runs in the background of the operating system (e.g., Windows XP) and initiates, processes and distributes print jobs to the appropriate print device.

Install Print Driver Function: By passing a server name and a full driver name (exactly as it is designated in the .inf file), the printer tools utility will look at the dfsroot structure, designated for local use, for the pdenum.ini file which designates which .inf file should be referenced. By then referencing the .inf file, the printer tools utility installs the appropriate driver files to the server designated. If the server name is passed as an empty quote, then the local server will have the driver installed. It is important to note that if the driver name has spaces it is a good idea to use quotes around the name.

Delete Print Driver Function: By passing a server name and a full driver name (exactly as it is designated in the .inf file), the printer tools utility will completely remove the driver and all associated driver files from the server. It is important to note whether or not the driver is in use by the system. This is usually the case if a print queue is using that driver. To properly remove the driver, it will be necessary to remove the print queue first. Sometimes the driver is still difficult to delete even without an associated print queue. In this case, restarting the print spooler service (printertools.exe -restart \\server) will resolve this issue. If the server name is passed as an empty quote, then the local server will have the driver removed.

Enumerate Print Drivers function: This function will print to the console a list of all drivers installed on the server name that is passed. If the server name is passed as an empty quote then the driver list will reflect what is on the local server.

Install Printer Port function: The printer tools utility will install printer ports on the server name passed. There are three basic types of printer ports that the printer tools utility will install: line printer terminal (LPT), ready to print (RAW) and local. The RAW protocol (also known as port 9100) is the default protocol that is used by most TCP/IP print devices. In all cases, the parameters passed will include the server name on which the port will be installed and the port name. The type of printer port that is needed usually depends on the type of physical printer with which the server is trying to communicate. In most cases a RAW port is perfectly fine and should be the default install. LPT ports require two more parameters than the other two. The "QueueName" parameter is a specific name usually required by the physical printer and the "ByteCnt" parameter is a Boolean reference as to whether the port should count the bytes passed. This also may be required by the physical printer.

Delete Print Port function: Passed the server and the port name, this function will remove the port from the server. It is important to note that if the port is in use, it will not be capable of being removed. In most cases, removing the queue attached to the port will allow the port to be removed. If this doesn't work, restarting the Print Spooler service will help (printertools.exe-restart \\server).

Enumerate Printer Ports function: This function will print to the console a list all printer ports installed on the server name passed. If the server name is passed as an empty quote, then the driver list will reflect what is on the local server.

Install Printer function: This function requires the port whose name is passed to have been created already. However, this function will automatically install the driver whose name is passed (the appropriate DFS structure must be in place for this to work).

Delete Printer function: Given the server name and the printer name, this function will remove the print queue from the server. If the server name is passed as an empty quote the queue will be removed from the local server. The print driver and the printer port will be left intact.

Enumerate Printers function: This function will print to the console a list of all printer queues installed on the server name passed. If the server name is passed as an empty quote, then the driver list will reflect what is on the local server.

Remove All Printers function: This unique "zap" function can be very powerful and very dangerous. This function will remove all instances of printer queues, ports and drivers from the server. This function will remove all driver files and registry settings. If it functions without errors, the server should be as it was before it had the first print queue installed on it. This can be very helpful in cleaning out servers which seem to have residual printer problems after all other efforts have been exhausted. The "Backup Print Server" function in the printer tools utility should be used before using this function. The "-zap!" parameter must be formatted exactly as is shown in the table, or it will not work. If the server name function is passed as an empty quote, the local server will be "zapped."

Backup Printers function: This is one of the most powerful features of the printer tools utility. This feature requires another very important network structure to be in place in order to work however. The feature uses another DNS canonical name (Cname) and share combination called \\backups\backups$. In order to setup this function, the user sets the DNS CName "Backups" to point to any designated server. The user then creates a shared folder on that server named "Backups$." The printer tools utility will automatically create a server name folder structure under this share and build its backup information there. Everything placed under this folder will be used by the "Restore Printers" function to completely recreate the printers that formally existed on the server at the time of the backup. This function can be run on each server nightly using the task scheduler to maintain a backup of all print servers in the system. The restore process is much faster and cleaner than any other conventional backup and restore process. This function could be used in the "server customizer" tool, referred to above, for preparing servers being replaced under a lease term.

Restore Printers function: Provided that everything is in place which was described in the "Backup Printers" section, and a successful backup has been created, this function will restore all printers which were installed at the time of the backup. This function also will reinstall from scratch all associated print drivers. This function could be used in the "server customizer" tool for restoring servers that are simply replacing old servers under a lease term.

This function can be quite useful when a print server is having some problems, which appear to be driver-related, but are difficult to troubleshoot. Simply running the "zap" function will restore all of the printers from backup.

Ping Device function: This function is not substantially different from the command-line "Ping" function available on every computer, except that it only returns one line and can be used in a batch file. The printer tools utility uses ping internally for various purposes.

Restart Print Spooler function: This function will stop and then restart the print spooler service and all dependent services on the server whose name is passed. If the server name is passed as an empty quote the local print spooler will be restarted.

Stop Print Spooler function: This function will stop the print spooler service and all dependent services on the server whose name is passed. If the server name is passed as an empty quote the local print spooler will be stopped.

Start Print Spooler function: This function will start the print spooler service on the server whose name is passed. If the server name is passed as an empty quote the local print spooler will be started.

Create PDEnum.ini from PDU.ini function: There are two important initialization (.ini) files that are located in the pdu_xp folders, i.e., pdu.ini and pdenum.ini. Both of these files contain the information required for the printer tools utility to properly locate the driver information and properly install the drivers. The pdu.ini file is a legacy file, but is still created by the PDTest utility. This function (pdu2pdenum) allows the printer tools utility to create the pdenum.ini file in the appropriate format from the pdu.ini file. PDEnum.ini is required for the printer tools utility to function properly.

Set PDU Shares function: This function is used for maintaining the appropriate share structures on the PDU server. When the function is run, it will prompt for the latest PDU version number and change the network shares named pdu_xp$ and pdu_inf$ to that new PDU version number. In addition, a call is made to PDTouch if it is located in the same folder. This will touch all files in the pdu_xp$ and pdu_inf$ folders.

Printer Driver Test Utility

The printer driver test utility (PDTest) is the first step to centralized print driver management. This utility will take any print driver and run it through a series of tests to determine if it is safe to run on a standard Microsoft Windows print server. The software is designed to be run on a server. The server should have an assigned DNS canonical name (Cname) of PDTest. The actual server name is arbitrary. The server should have a folder on it named PDTest$.

FIG. 3-6 illustrates exemplary user interfaces for the print driver test utility. The main user interface display 300, illustrated in FIG. 3, includes a folder selection section 310 that provides a scrollable list of printer folders that include the corresponding print drivers. The HP LaserJet 8000 printer folder 312 is shown selected in the figure. The current version 302 and new version 304 of the print driver are shown in the upper left of the user interface 300. Radio buttons shown in the upper right of the user interface are used to select a function. The test radio button 306 is shown selected. The user can click the "test" button 308 to initiate driver testing, or can click the "exit" button 320 to exit the print driver test utility. Clicking the "test" button results in the next user interface display depicted in FIG. 4.

Figure 4:
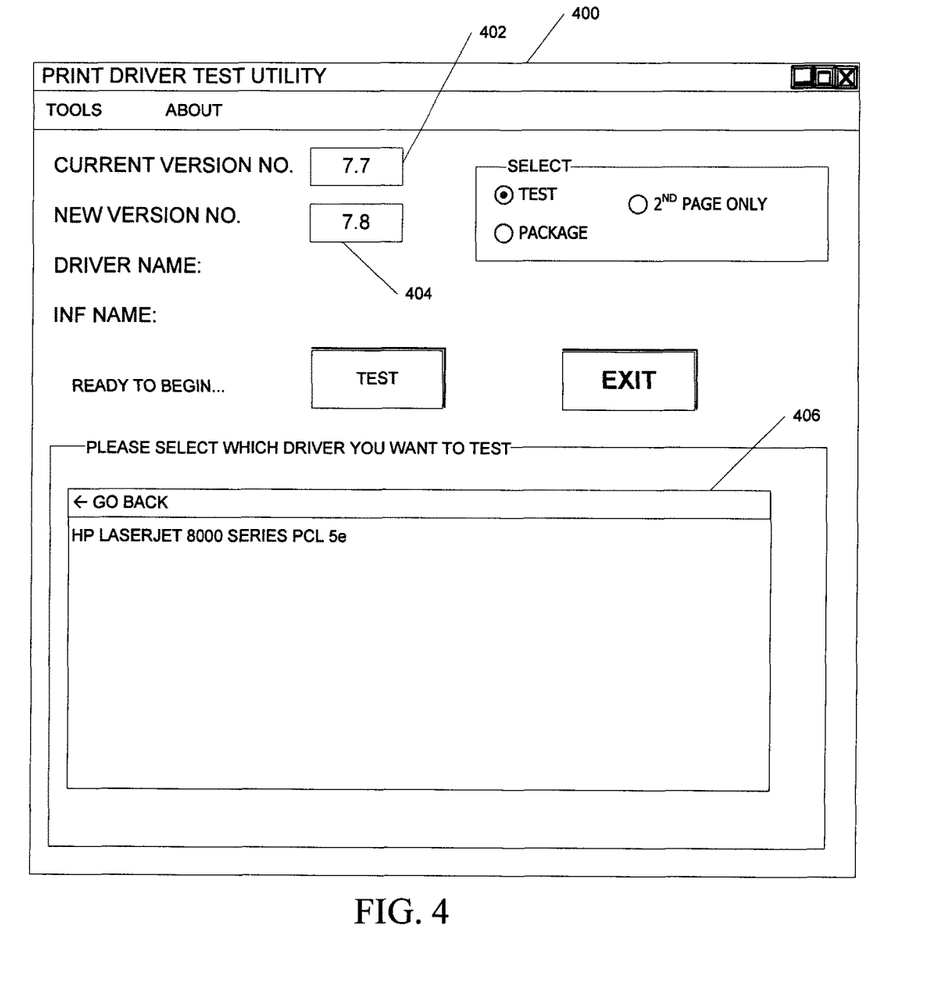
Figure 5:
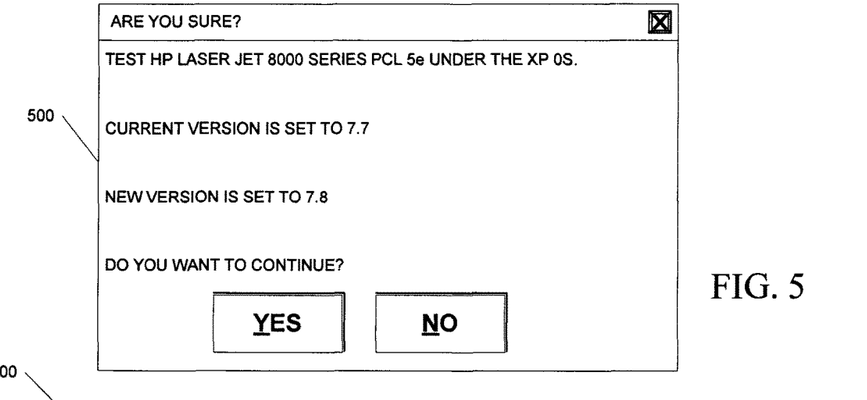
Figure 6:
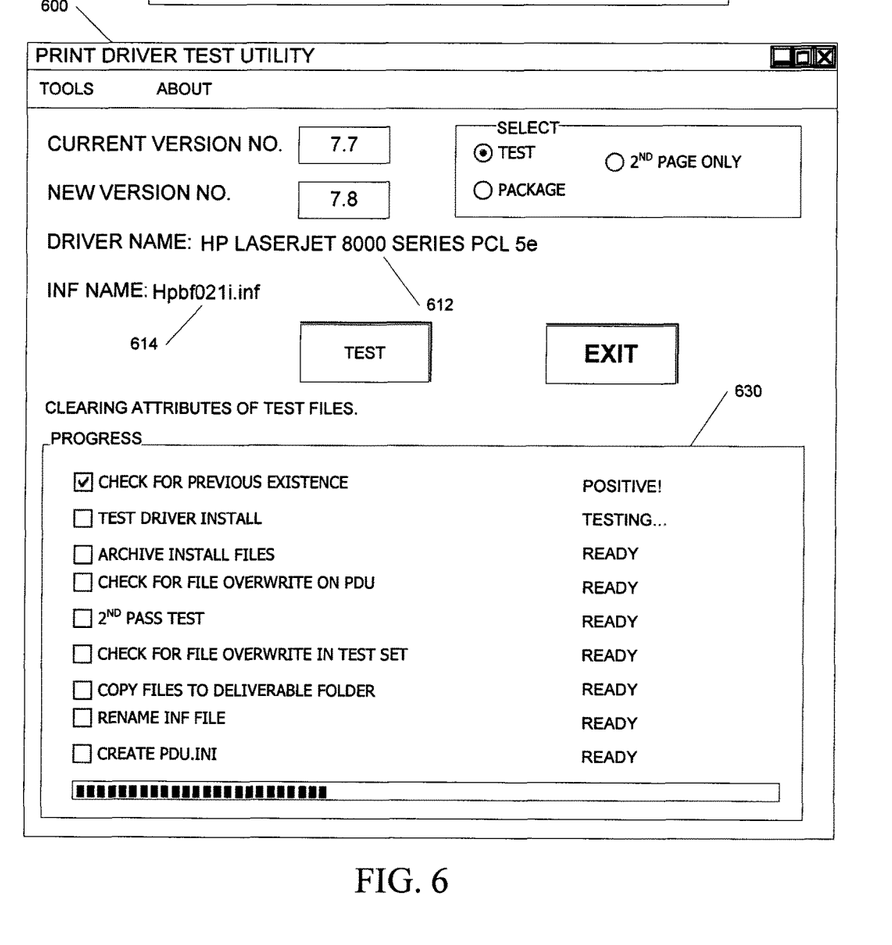

FIG. 4 illustrates the print driver test utility user interface display 400 having a section 406 for selection of the driver to be tested. Selection of the driver to test results in a pop up window 500 shown in FIG. 5. The window identifies the printer driver to test, the current and new versions of the printer driver, and asks the user if he wants to continue with driver testing. A positive response will result in a print driver test utility user interface display 600 as shown in FIG. 6. The display shows the name of the driver being tested 612, the corresponding information file name 614, the current version number 602, the new version number 604 and a progress section 630 that identifies the progression of the driver test processing.

Pseudo code for the print driver test utility is as follows and includes the process steps of "prepare," "test," "package" and "submit."

1. Prepare
a. connect to \\pdtest\pdtest$;
b. create folder for driver to test in \downloads\drivername;
c. download driver(s) to be tested:
(1) for drivers not supplied by client, go to web site of manufacturer to download;
(2) if the driver exists in another information file in an archive on pdtest, use the "source files;"
(3) read descriptions of drivers to ensure download of correct driver(s);
(4) for printers, look for the postscript driver unless specified otherwise; for MFD's, use the postscript driver where available unless PCL is specified; for plotters, ask the client specifically if the postscript option is available;
(5) unzip files where applicable.
d. edit the information file:
(1) comment out drivers not being installed;
(2) comment out language monitors where applicable (search for text "mon").
2. Test
Driver Install and Compatibility Testing:
e. run pdtest.exe; select driver; choose "Test" to complete the following steps:
(1) check for previous existence;
(2) test driver install;
(3) archive driver install files:
(rename inf unless multiple drivers in one inf file being tested)
(a) second pass confirms all files required for install are captured
(edit the inf and expand file names where applicable; flag=file not found namd.xx_)
(4) check for file overwrite/impact.
Driver Function Testing:
f create a test queue on workstation (or test server) with "port=file" using the driver files as the source;
g. generate test print [Printer; Properties; [Print Test Page]:
(1) test print successful (no errors generated)?
(2) access and manipulate device settings or properties successfully?
3. Package
h. run pdtest.exe; select "Package" to complete the following steps:
(1) collect deliverable files;
(a) . . . \deliverables\deltaxp\<version#>
(b) . . . \deliverables\inf\<version#>
(2) generate pdu.ini.
4. Submit
i. create folder " . . . \deliverables\fullxp\<version#>;
j. copy "\pdu\<current set>\pdu.ini to . . . \deliverables\fullxp\<version#>;
k. build new fullxp pdu.ini (append \deltaxp\pdu.ini drivers to fullxp\pdu.ini and "clean up" the list).

When prompted to replace files it should be noted that newer versions of manufacturer-specific files are usually backwards compatible, but should be tested for verification. To determine what other drivers may be impacted, the operating system search function should be used to determine which other information (inf) files includes that file name. To determine if a driver functions correctly with a different file version, the driver should be loaded on the workstation and the file(s) replaced to determine if the driver still functions correctly. If a file replacement could potentially impact multiple other drivers, the new driver should be tried with the existing file version (pdu).

Figure 7:
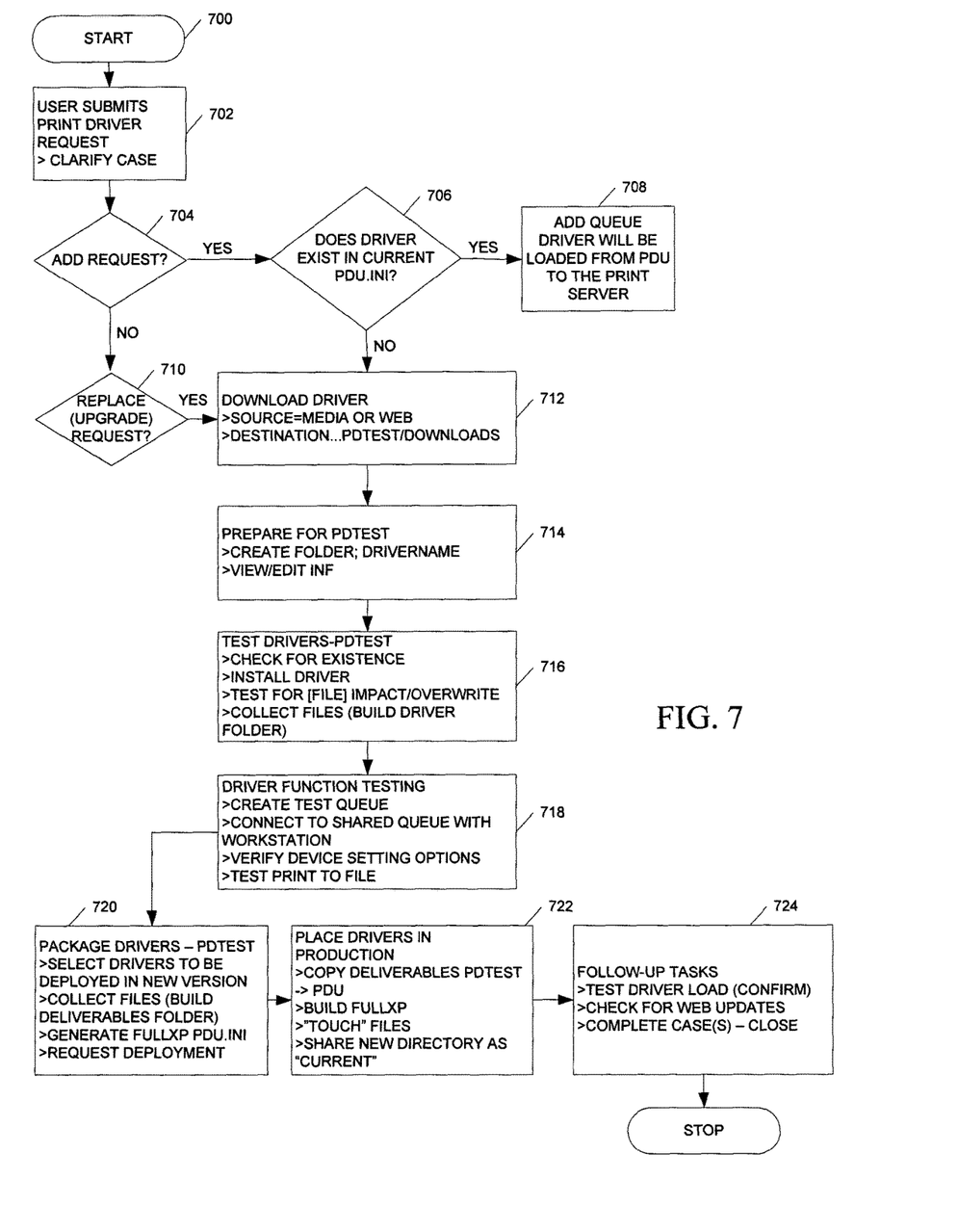
FIG. 7 illustrates the processing logic for testing a printer driver in accordance with an exemplary embodiment of the invention.

FIG. 7 illustrates the processing logic for testing a printer driver in an exemplary embodiment. When the process is started (block 700), the user submits a print driver request as indicated in block 702. A determination is then made in decision block 704 as to whether or not the print driver request should be added. If the determination is positive, a test is made in decision block 706 to determine if the driver exists in the current PDU initialization file. If the driver currently exists, it will be added to a queue for loading from the PDU server to the appropriate print server as indicated in block 708. If the driver does not exist in the current PDU.ini file, or if an upgrade request has been requested (decision block 710), the driver is downloaded as indicated in block 712. Next, as indicated in block 714, the printer driver test is prepared by creating a folder for the driver to be tested, and viewing/editing the associated information file. The driver is then tested as indicated in block 716. This involves checking for the existence of the driver, installing the driver, testing for file overwrite/impact and collecting the driver files (i.e., build driver folder). Driver function testing then is performed as indicated in block 718. A test queue is created on a workstation or test server. The workstation is connected to the shared queue. Device setting options are verified and a test print is generated.

After driver function testing is completed, the tested drivers are selected for deployment in new versions, files are collected to build a deliverables folder, and a PDU initialization file is generated as indicated in the "package drivers" block 720. The drivers then are placed in production as indicated in logic block 722. The files are also "touched" by the print driver touch utility (PDTouch) as discussed below. Follow-up tasks are then performed as indicated in logic block 724. This includes testing of driver load and checking for web updates. Once these steps are finished, the print driver case submitted by a user is closed as being completed. Other administrative tasks are also performed such as notifying users and information technology personnel via email of the print driver request/updates that have been completed successfully.

Print Driver Touch Utility

In an exemplary embodiment, the print driver touch utility (PDTouch) is a simple utility for print driver management written in C++. The specific programming language used is not material to the invention. The purpose of PDTouch is to alter files so that their date and time stamp become the current date at midnight. The primary purpose in doing this is in managing print drivers. When deploying new drivers to a server, it is important that the date and time stamp be later than those on the server otherwise the workstation will not attempt to pull down the new drivers. The command line format for the PDTouch utility in a Windows-operating environment is as follows:

usage: PDTouch [-?]|[-t filepath]|[-p [\\servername]]|
   [-vd version#]|[-vf version#]|[-vi version#][-i]
where:
-? displays this message;
-t with the file path of files to be touched; all files in that folder will be touched; the date and time stamp will be set to the current time and date;
-I only *.inf files will be touched, if they begin with oem*;
-p with \\ServerName will touch all Windows 2000 print drivers on remote server; without server name will touch drivers on local machine;
-vd with version # will touch all delta files on PDU of specified version;

-vf with version # will touch all full files on PDU of specified version;

-vi with version # will touch all *.inf files on PDU of specified version.

Although the exemplary embodiment has been described in the context of a large Windows-based server environment, the basic invention described herein is applicable to other types of network environments, print servers and operating systems (e.g. Linux). The invention can be used with printers supplied from any commercial vendor.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A method, comprising:
    testing, by a printer driver test server, each requested printer driver using a window to test a current version and a new version in a controlled environment to determine whether the driver is compatible with at least one other driver in a set of drivers;
    after printer driver testing is completed, collecting files to build a deliverables folder and generating a Print Driver Update initialization file with the tested printer drivers, and transmitting, from the printer driver test server, the tested printer drivers for storage at a centralized printer driver update server for deployment on at least one server hosting a distributed file share, wherein the tested print drivers are provided with a later date and time stamp than those on the at least one server hosting the distributed file share;
    wherein the testing of each requested printer driver comprises:
        confirming that all files required for installation of the printer driver have been captured,
        deploying the tested driver and associated file to the at least one server hosting the distributed file share, and
        downloading the tested driver and associated file to at least one print server, and
        the window identifies each of the requested printer drivers to test, the current version, and the new version.

2. The method for printer driver management of claim 1, further comprising generating an altered date and time stamp for at least one file associated with the tested driver to ensure that updated driver files are automatically downloaded from the print server.

3. The method for printer driver management of claim 1, further comprising at least one of:
    conditioning the tested printer driver for inclusion in the centralized printer driver update server that stores a plurality of sets of versioned drivers when the tested printer drive is determined to be compatible;
    storing the tested driver and at least one associated file in the centralized printer driver update server; and
    determining whether the requested printer driver exists in the centralized printer driver update server.

4. The method for printer driver management of claim 1, further comprising determining whether a new version exists for the requested printer driver.

5. The method for printer driver management of claim 1, further comprising downloading the requested printer driver to a server in the controlled environment.

6. The method for printer driver management of claim 1, further comprising preparing the printer driver for testing by creating a folder for the printer driver to be tested and editing an information file associated with the printer driver.

7. The method for printer driver management of claim 1, wherein the testing of the printer driver comprises driver installation and compatibility testing and driver function testing.

8. The method for printer driver management of claim 7, wherein the testing of the driver installation and compatibility comprises at least one of checking for a previous installation of the printer driver and archiving the printer driver installation files.

9. The method for printer driver management of claim 7, wherein the testing of the driver function comprises generating a test print on a printer in the controlled environment.

10. The method for printer driver management of claim 2, further comprising: packaging the printer driver and associated file for storage in the centralized printer driver update server.

11. The method for printer driver management of claim 9, further comprising determining whether the printer driver functions appropriately with a different version of the associated file.

12. A computer program product embodied on a non-transitory computer readable medium, the computer program product configured to cause a processor to:
    test each requested printer driver at a printer driver test server using a window to test a current version and a new version in a controlled environment to determine whether the driver is compatible with at least one other driver in a set of drivers; and
    after printer driver testing is completed, collect files to build a deliverables folder and generate a Print Driver Update initialization file with the tested printer drivers, and, transmit, from the printer driver test server, the tested printer drivers for storage at a centralized printer driver update server for deployment on at least one server hosting a distributed file share, wherein the tested print drivers are provided with a later date and time stamp than those on the at least one server hosting the distributed file share;
    wherein the testing of each of the requested printer drivers being tested comprises:
        confirming that all files required for installation of the printer driver have been captured,
        deploying the tested driver and associated file to the at least one server hosting the distributed file share, and downloading the tested driver and associated file to at least one print server, and the window identifies each of the requested printer drivers to test, the current version, and the new version.

13. The computer program product for printer driver management of claim 12, wherein the computer program product is further configured to cause the processor to generate an altered date and time stamp for at least one file associated with the tested driver to ensure that updated driver files are automatically downloaded from the print server.

14. The computer program product for printer driver management of claim 12, wherein the computer program product is further configured to cause the processor to perform at least one of:

determine whether the requested printer driver exists in the centralized printer driver update server;

condition the tested printer driver for inclusion in the centralized printer driver update server that stores a plurality of sets of versioned drivers, when the tested printer driver determined to be compatible; and store the tested driver and at least one associated file in the centralized printer driver update server.

15. The computer program product for printer driver management of claim 12, wherein the computer program product is further configured to cause the processor to determine whether a new version exists for the requested printer driver.

16. The computer program product for printer driver management of claim 12, wherein the computer program product is further configured to cause the processor to download the requested printer driver to a server in the controlled environment.

17. The computer program product for printer driver management of claim 12, wherein the computer program product is further configured to cause the processor to prepare the printer driver for testing by creating a folder for the printer driver to be tested and editing an information file associated with the printer driver.

18. The computer program product for printer driver management of claim 12, wherein the computer program product is further configured to cause the processor to test the printer driver comprise driver installation and compatibility testing and driver function testing.

19. The computer program product for printer driver management of claim 18, wherein the computer program product is further configured to cause the processor to test driver installation and compatibility include at least one of program instructions that check for a previous installation of the printer driver and archive the printer driver installation files.

20. The computer program product for printer driver management of claim 18, wherein the computer program product is further configured to cause the processor to test driver function comprises access and manipulate printer driver settings.

21. The computer program product for printer driver management of claim 12, wherein the computer program product is further configured to cause the processor to package the printer driver and associated file for storage in the centralized printer driver update server.

22. The computer program product for printer driver management of claim 20, wherein the computer program product is further configured to cause the processor to determine whether the printer driver functions appropriately with a different version of the associated file.

23. A system, comprising:

a test server configured to:

test each requested printer driver using a window to test a current version and a new version in a controlled environment, wherein the window identifies each of the requested printer drivers to test, the current version, and the new version, and after printer driver testing is completed, collect files to build a deliverables folder and generating a Print Driver Update initialization file with the tested printer drivers, and transmit the tested printer drivers for storage at a centralized printer driver update server for deployment on at least one server hosting a distributed file share, wherein the tested print drivers are provided with a later date and time stamp than those on the at least one server hosting the distributed file share;

wherein the testing of each of the requested printer drivers being tested comprises confirming whether all files required for printer driver installation have been captured;

a plurality of print servers;

a printer driver test component configured to test the requested printer driver on the test server and condition the printer driver for inclusion in the centralized printer driver update server; and a printer tools component configured to manage a deployment of the requested printer driver and an associated file to the plurality of print servers.

24. The system for printer driver management of claim 23, further comprising at least one server configured to host a distributed file share and store the printer driver and associated file for distribution to at least one print server.

25. The system for printer driver management of claim 23, further comprising a component configured to generate an altered date and time stamp for the file associated with the tested driver to ensure that updated driver files are automatically downloaded from the print server.

26. The system for printer driver management of claim 23, wherein the printer driver test component comprises a module configured to prepare the printer driver for testing when a folder for the printer driver is created to be tested and an information file associated with the printer driver is edited.

27. The system for printer driver management of claim 23, wherein the printer driver test component comprises a module configured to test driver installation and compatibility, and a module configured to test driver function.

28. The system for printer driver management of claim 27, wherein the module that is configured to test driver installation and compatibility is further configured to perform at least one of checking for a previous installation of the printer driver and archiving the printer driver installation files.

29. The system for printer driver management of claim 27, wherein the module that is configured to test driver function is further configured to access and manipulate printer driver settings.

30. The system for printer driver management of claim 23, wherein the printer tools component is configured to package the printer driver and associated file for storage in the centralized printer driver update server.

31. The system for printer driver management of claim 23, wherein the printer driver test component is further configured to determine whether the printer driver functions appropriately with a different version of the associated file.

* * * * *